United States Patent
Agrawal (10) Patent No.: US 9,185,118 B1
(45) Date of Patent: *Nov. 10, 2015

(54) PREVENTING INAPPROPRIATE DATA TRANSFERS BASED ON REPUTATION SCORES

(71) Applicant: SYMANTEC CORPORATION, Mountain View, CA (US)

(72) Inventor: Mukund Agrawal, Maharashtra (IN)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,557

(22) Filed: May 9, 2014

Related U.S. Application Data (63) Continuation of application No. 13/103,794, filed on May 9, 2011, now Pat. No. 8,763,072.

(51) Int. Cl.
| | |
|---|---|
| *H04L 9/00* | (2006.01) |
| *G06F 9/00* | (2006.01) |
| *H04L 29/06* | (2006.01) |
| *G06F 21/64* | (2013.01) |
| *G06F 21/55* | (2013.01) |

(52) U.S. Cl.
CPC ............ *H04L 63/105* (2013.01); *G06F 21/552* (2013.01); *G06F 21/64* (2013.01)

(58) Field of Classification Search
CPC . H04L 63/20; H04L 63/1416; H04L 63/1425; H04L 63/1433; H04L 63/145; G06F 21/577; G06F 21/60; G06F 21/6245

USPC ............ 726/1, 22–30, 11; 713/165, 167, 193; 709/225, 229
See application file for complete search history.

(56) References Cited

U.S. PATENT DOCUMENTS

| | | | |
|---|---|---|---|
| 7,996,373 B1 * | 8/2011 | Zoppas et al. ................ 707/694 |
| 8,286,253 B1 | 10/2012 | Lu et al. | |
| 8,365,243 B1 | 1/2013 | Lu et al. | |
| 8,392,998 B1 * | 3/2013 | Schrecker et al. .............. 726/25 |
| 8,495,705 B1 * | 7/2013 | Verma et al. ...................... 726/1 |
| 8,499,152 B1 | 7/2013 | Chen et al. | |
| 8,565,108 B1 | 10/2013 | Marshall et al. | |

(Continued)

OTHER PUBLICATIONS

Hart, Michael et al. "Text Classification for data loss prevention," Jun. 2011, PETS'11 Proceedings of the 11th international conference on privacy enhancing technologies, ISBN: 978-3-64222262-7, pp. 18-37.

(Continued)

*Primary Examiner* — Hosuk Song
(74) *Attorney, Agent, or Firm* — Lowenstein Sandler LLP (57) ABSTRACT

A method and apparatus for detecting violations of data loss prevention (DLP) policies based on reputation scores. The DLP agent monitors outbound data transfers performed by a computing system. The DLP agent classifies the outbound data transfers based on data types. The DLP agent determines reputations source for the outbound data transfers to a destination entity based on the classifying and the destination entity, the first outbound data transfer being a first data type and the second outbound data transfer being a second data type. The DLP agent compares the first reputation score and the second reputation score against a reputation threshold to detect violations of a DLP policy. At least one of remedial operations or reporting operations is performed in response to the detected violations.

20 Claims, 5 Drawing Sheets

(56) References Cited

U.S. PATENT DOCUMENTS

| | | | |
|---|---|---|---|
| 8,627,403 B1* | 1/2014 | Kirshenbaum et al. | 726/1 |
| 8,763,072 B2* | 6/2014 | Agrawal | 726/1 |
| 8,800,031 B2* | 8/2014 | Cecil et al. | 726/22 |
| 2009/0125980 A1 | 5/2009 | Alperovitch et al. | |
| 2009/0157667 A1 | 6/2009 | Brougher et al. | |
| 2010/0161830 A1 | 6/2010 | Noy et al. | |
| 2010/0251369 A1 | 9/2010 | Grant | |
| 2011/0199902 A1 | 8/2011 | Leavy et al. | |
| 2011/0246753 A1 | 10/2011 | Thomas | |
| 2012/0106366 A1 | 5/2012 | Gauvin | |
| 2012/0137368 A1 | 5/2012 | Vanstone et al. | |
| 2012/0137375 A1 | 5/2012 | Ramachandran | |
| 2012/0150773 A1 | 6/2012 | DiCorpo et al. | |
| 2012/0151551 A1 | 6/2012 | Readshaw et al. | |
| 2012/0210437 A1 | 8/2012 | Karande et al. | |

OTHER PUBLICATIONS

Hashimoto et al, A security Framework to protect against Social Networkd Services Threats, Aug. 2010, IEEE, E-ISBN: 978-0-7695-4145-7, pp. 189-194.

Kim, et al. "Design of internal information leakage detection system considering the privacy violation," Nov. 2010, IEEE, ISBN: 978-4244-9806-2, pp. 480-481.

USPTO Non-Final Office Action for U.S. Appl. No. 13/103,794 mailed Jan. 2, 2013.

USPTO Non-Final Office Action for U.S. Appl. No. 13/103,794 mailed Jul. 31. 2013.

USPTO Notice of Allowance for U.S. Appl. No. 13/103,794 mailed Feb. 24, 2014.

* cited by examiner

PREVENTING INAPPROPRIATE DATA TRANSFERS BASED ON REPUTATION SCORES

RELATED CASES

This application is a continuation of U.S. patent application Ser. No. 13/103,794, filed May 9, 2011, the entire contents of which are hereby incorporated by reference herein.

TECHNICAL FIELD

Embodiments of the invention relate to the field of processing data, and more particularly, to improving data loss prevention (DLP) by preventing inappropriate data transfers based on reputation scores.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor. For example, the mobile applications market is expected to exceed 20 billion dollars in upcoming years. It has become more common for users to install mobile applications on their mobile devices, such as handheld devices, mobile smart phone, tablets, netbooks, etc. Not all of these mobile applications (commonly referred to as apps) are developed by reliable entities. These apps may need to send data, for example, stock portfolio details, credit card details, health details, or other sensitive information to a server computing system to provide certain functionality. Also, users are continuously exchanging data with each other via computer social network sites like Facebook, MySpace, etc. In addition, various backup and security products installed on user machines may continuously send user data to a backup or security server. In other situations, whenever a user faces any software crash like a browser crash or application crash, the application may ask the user to tell the software provider about the crash, requiring the user to transmit some logs to an external entity. Although the software provider may promise to preserve anonymity, this information may still be exposed to humans for viewing. For example, if a browser crashed while transmitting credit card data, bank balance, etc, sending the log may expose the credit card and bank balance information.

Existing security techniques fail to provide efficient solutions that can protect organizations in the situations described above. These existing DLP technologies do not have a way to categorize the type of data for the particular destination entities receiving the data. For example, classifying entities into malicious and non-malicious is insufficient because all of these entities are presumably doing a useful service, as permitted by the user, and receive some useful data. These entities, however, are supposed to be receiving only certain types of data to perform the useful service. For example, a music application should only access and send music-related information, such as a playlist of music, to its server computing system. However, if other type of information, e.g., tax information, is saved in the same folder, the music application should not transmit the other type of information to the server computing system. Existing security techniques do not provide an efficient solution to prevent the application from transmitting the other data types to these destination entities that should not be receiving data of these other data types. Furthermore, these complex communications of different data types may occur between various different entities, and existing DLP technologies do not distinguish between the types of data being sent to these entities.

SUMMARY OF THE INVENTION

A method and apparatus for detecting violations of data loss prevention (DLP) policies based on reputation scores. The DLP agent monitors outbound data transfers performed by the computing system. The DLP agent classifies the outbound data transfers based on data types. The DLP agent determines reputations source for the outbound data transfers to a destination entity based on the classifying and the destination entity, the first outbound data transfer being a first data type and the second outbound data transfer being a second data type. The DLP agent compares the first reputation score and the second reputation score against a reputation threshold to detect violations of a DLP policy. At least one of remedial operations or reporting operations is performed in response to the detected violations.

In one embodiment, a method includes monitoring, by a data loss prevention (DLP) agent executing on a computing system, outbound data transfers performed by the computing system; classifying the outbound data transfers as being one of a plurality of data types; determining a first reputation score for a first outbound data transfer to a destination entity specified to receive the first outbound data transfer based on the classifying and the destination entity, wherein the first outbound data transfer is a first data type of the plurality of data types; determining a second reputation score for a second outbound data transfer to the destination entity specified to receive the second outbound data transfer based on the classifying and the destination entity, wherein the second outbound data transfer is a second data type of the plurality of data types; comparing the first reputation score against a reputation threshold to detect a first violation of a DLP policy, wherein the first violation is detected when the first reputation score is less than the reputation threshold; comparing the second reputation score against the reputation threshold to detect a second violation of the DLP policy, wherein the second violation is detected when the second reputation score is less than reputation threshold; and performing at least one of remedial operations or reporting operations in response to the first violation, second violation or both being detected.

In a further embodiment, the method further includes generating an alert to a user of the computing system to approve or deny a respective one of the first outbound data transfer or second outbound data transfer; receiving user input from the user to approve or deny the respective outbound data transfer; allowing the respective outbound data transfer when the user approves the respective outbound data transfer; and preventing the respective outbound data transfer when the user denies the respective outbound data transfer.

In a further embodiment, the method further includes updating an overall reputation score of the destination entity based on the first reputation score and the second reputation score. In a further embodiment, the method includes sharing the overall reputation score with a network community service. In a further embodiment, the method further includes updating a first data-type reputation score of the destination entity for the first data type based on the first reputation score; and updating a second data-type reputation score of the destination entity for the second data type based on the second reputation score. In a further embodiment, the method includes sharing the first data-type reputation score and the second data-type reputation score with a network community service.

In yet a further embodiment, the first reputation score or second reputation score includes associating the data of a respective one of the first outbound data transfer or second outbound data transfer with a respective one of the first data type or second data type; associating the data with the destination entity; and calculating the respective one of the first reputation score or second reputation score using the respective data type and the destination entity.

In a further embodiment, the respective one of the first reputation score or second reputation score includes at least one of the following: determining if the respective outbound data transfer is a first time that any data is being transmitted to the destination entity by the computing device; determining if the respective outbound data transfer is a first time that data of the respective data type is being transmitted to the destination entity by the computing device; determining if an overall reputation score for the destination entity is below an overall reputation threshold; or determining if a data-type reputation score of the destination entity for the respective data type is below a data-type reputation threshold.

In a further embodiment, the method includes categorizing the data of each of the outbound data transfers into one of a plurality of categories, wherein each of the plurality of categories represents a different one of the plurality of data types.

In a further embodiment, the method includes receiving input from a user of the computing system to define the plurality of categories.

In a further embodiment, the method includes receiving at least one of an overall reputation score of the destination entity from a network community service or one or more data-type reputation scores for the destination entity for the plurality of data types.

In a further embodiment, the method determines the reputation score by: tracking a number of previously-detected violations of the DLP policy by previous data transfers to the destination entity; and calculating the reputation score for the at least one data transfer based on the data type being transferred to the destination entity and the tracked number of previously-detected violations.

In a further embodiment, the method includes comparing the first reputation score against a first data-type reputation threshold for the first data type, wherein the first violation is detected when the first reputation score is less than the first data-type reputation threshold; comparing the second reputation score against a second data-type reputation threshold for the second data type, wherein the second violation is detected when the second reputation score is less than the second data-type reputation threshold; and performing the at least one of the remedial operations or reporting operations in response to the first violation, second violation or both being detected based on the comparing against the first data-type reputation threshold and second data-type reputation threshold.

In addition, a computer readable storage medium for detecting violations of DLP policies based on reputation scores is described. An exemplary computer readable storage medium provides instructions, which when executed on a processing system causes the processing system to perform operations such as the exemplary methods discussed above.

Further, systems and apparatus for detecting violations of DLP policies based on reputation scores are described. An exemplary apparatus may include a memory and a processor coupled to the memory. The processor is configured to perform the operations described herein.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for detecting violations of data loss prevention (DLP) policies based on reputation scores. The embodiments described herein provide ways to determine whether to transmit a given type of data to a remote entity. In one embodiment, a DLP agent hosted by a computing system monitors outbound data transfers performed by the computing system. The DLP agent determines a reputation score for each of the data transfers to destination entities, specified in the data transfers. The DLP agent determines the reputation scores based on a data type of the data being transferred to the respective destination entity. The DLP agent detects a violation of the DLP policy based on the reputation score. The DLP agent may report the violation to a DLP system, a system administrator, or the like. The DLP agent may also take remedial action in response to detecting the violation.

The destination entity may be a computing system, such as a computer, a mobile phone, an application executing on a computing system, a set of Internet Protocol (IP) addresses, a website, a Universal Serial Bus (USB) device, a disk device, an email address, an instant messenger service, a social network account, or the like. In one embodiment, the DLP agent includes a classification engine that is used to classify data into various categories that may be defined by the user, an administrator, or by some automated process, such as by an application. Some examples of valid categories for a smart phone may be, for example, Financial, Corporate, Health, Friends, Music, E-Mails, and the like. All outbound data transfer from the computing system is passed through the classification engine. Thus, each piece of outgoing data is associated with a category of data and a destination entity. The DLP agent also includes a reputation score calculator that determines a reputation score for each data transfer, for each destination, for each data type for each destination entity, or any combination thereof. The DLP agent also includes a detection system that uses the reputation scores to determine whether the data transfer is considered safe or risky (unsecure) based on various factors. If the data transfer is considered risky or unsecure, the DLP agent detects the data transfer as being a violation of a DLP policy and can take appropriate remedial or reporting measures as described below. In other embodiments, every time an transmitting entity allows or denies some data transfer, this decision may be taken as a parameter fed back into the reputation score calculation for the remote entity, as well as for the transmitting entity.

As described above, existing security techniques fail to provide a way to categorize the type of data for the destination entities receiving the data. The embodiments described herein provide an improved DLP system that allows categorization of the data into different categories and calculation of reputation scores for the destination entity for those different categories. These embodiments may be used to easily monitor outbound data transfers to various destination entities and detect violations of DLP policies based on reputation scores for those destination entities.

In the following description, numerous details are set forth. It will be apparent, however, to one of ordinary skill in the art having the benefit of this disclosure, that embodiments of the present invention may be practiced without these specific details.

Figure 1:
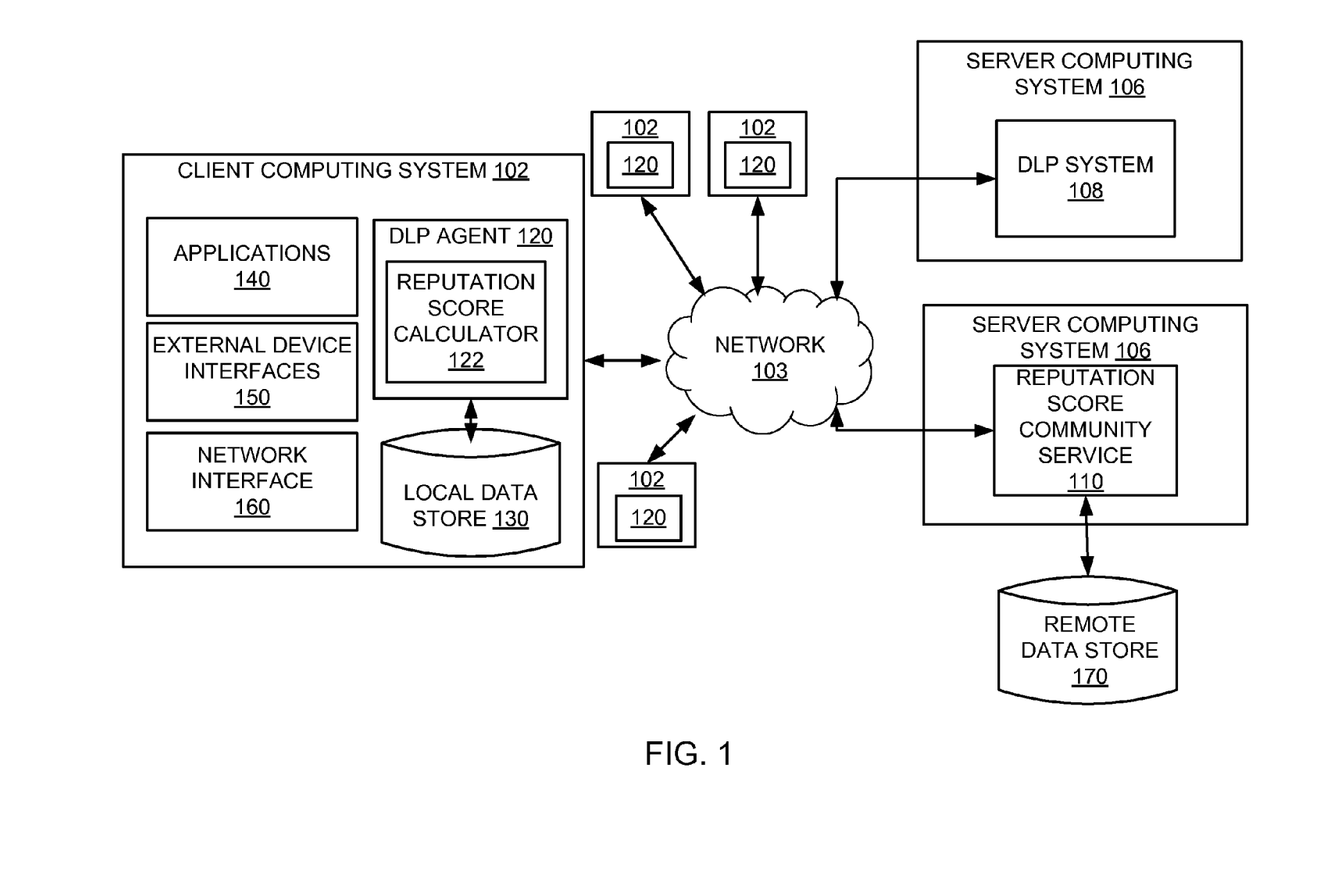
FIG. 1 is a block diagram of exemplary network architecture in which embodiments of the invention may operate.

FIG. 1 is a block diagram of an exemplary network architecture 100 in which embodiments of the invention may operate. The network architecture 100 may include multiple client computing systems 102 and multiple server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. One of the server computing systems 106 may host a DLP system 108, and another one of the server computing systems 106 may host a reputation score community service 110. Alternatively, a single computing system 106 may host the DLP system 108 and the reputation score community service 110. In one embodiment, the server computing systems 106 and the reputation score community service 110 may be part of an organization, such as a corporate enterprise. Alternatively, the server computing system 106 and the reputation score community service 110 may be part of different organizations.

The DLP system 108 may communicate with DLP agents 120. Although the embodiments may be used in a DLP system using DLP agents 120, the embodiments may also be used in other DLP products. Also, the embodiments described herein may be used in other applications that can be used for detecting violations of policies based on reputation scores as would be appreciated by one of ordinary skill in the art having the benefit of this disclosure.

The DLP agents 120 include a reputation score calculator 124, which is configured to calculate reputations scores for monitored outbound data transfers by the client computing system 102 (e.g., transmitting entity) to destination entities to detect violations of the DLP policy based on reputation scores. The DLP system 108 may communicate with DLP agents 120 on the client computing systems 102 to perform operations to enforce a DLP policy as described herein. The DLP agent 120 is configured to detect a violation of a DLP policy based on the reputation stores of the data transfers. When a violation is detected, the DLP agent 120 creates an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the reputation score calculator 122 to determine reputation scores of data transfers of different types of data to different entities.

In one embodiment, the reputation score community service 110 is used as an online community to rate destination entities, such as by maintaining reputation scores for the different destination entities, as well as the data types for these destination entities. For example, the reputation score community service 110 may maintain a database having multiple entries, each entry containing reputation information about the destination entity. In one embodiment, the reputation score community service 110 stores reputation score information in the remote data store 170, which is communicatively coupled to the server computing system 106. In another embodiment, the remote data store 170 is local to the server computing system 106, but still remote to the client computing system 102. In another embodiment, the reputation score community service 110 may be integrated with the DLP system 108. In this embodiment, the DLP system 108 may be configured to provide reputation scores to the DLP agents. The reputation score community service 110 can use multiple users in the community to determine the overall reputation scores of the destination entities and/or to determine data-type reputation scores for given data types for those destination entities. The DLP agents 120 can be configured to report the reputation scores to the reputation score community service 110, each time a reputation score is determined, or periodically. Alternatively, the DLP agent 120 can request the reputation scores from the reputation score community service 110 when determining the reputation score for a given data transfer. The reputation score community service 110 may be private or public. For example, the reputation score community service 110 may be managed by the same organization managing the DLP system 108, and the reputation scores are specific to the DLP policies of the particular organization. Alternatively, the reputation score community service 110 may be a public service to which subscribers of the service can submit reputation score information, as well as request the reputation scores from the service. The reputation score community service 110 can be used in other ways as would be appreciated by one of ordinary skill in the art having the benefit of this disclosure. It should also be noted that the reputation scores provided by the reputation score community service 110 may be used in place of the reputation scores computed by the reputation score calculator 122, or may be used as a parameter input to the reputation score calculator 122 for determining the reputation scores.

Although only two server computing systems 106 are illustrated in FIG. 1, the DLP system 108 and/or reputation score community service 110 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the reputation score community service 110 and the DLP system 108 are part of an organization's system referred to herein as entity. In another embodiment, a service provider hosts the reputation score community service 110 and the DLP system 108. The hosted service provider may also have multiple instances of the reputation score community service 110 and the DLP system 108 on multiple networks that communicate with the service provider over a public or private network. In another embodiment, two separate service providers host the reputation score community service 110 and the DLP system 108. It should be noted that various other network configurations can be used including, for example, hosted configurations, distributed configurations, centralized configurations, etc.

The depicted client computing system 102, which may operate as an endpoint machine in an enterprise network that uses the reputation score community service 110 and/or the DLP system 108 to enforce one or more DLP policies, includes a DLP agent 120 that communicates with the DLP system 108. Embodiments of the DLP agent 120 are described below with respect to FIGS. 2-3B. The client computing system 102 may include applications 140, external device interfaces 150, and network interfaces 160 that can be monitored by the DLP agent 102 as would be appreciated by one of ordinary skill in the art having the benefit of this disclosure. The client computing system 102 may also include a local data store 130, which can be one or more centralized data repositories that store the reputation score information, violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2:
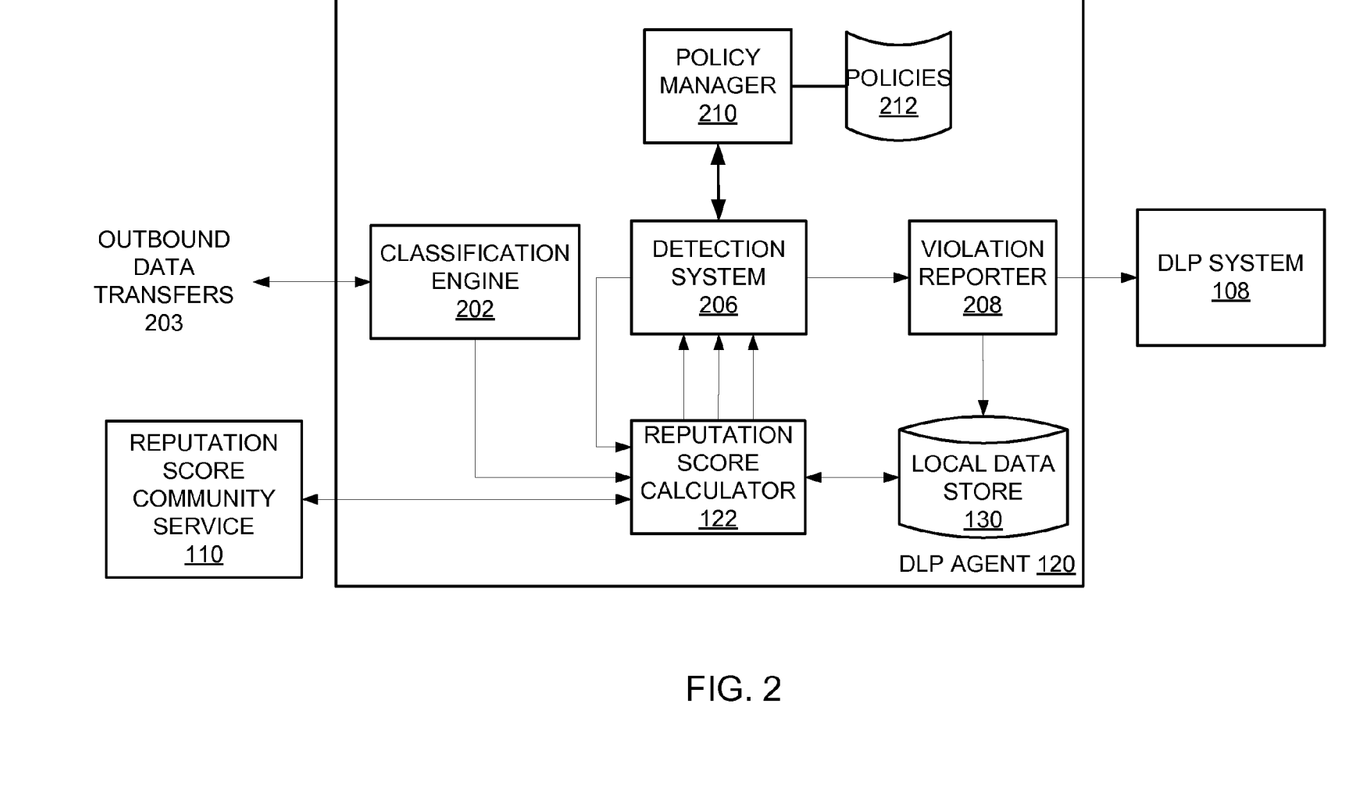
FIG. 2 is a block diagram of one embodiment of a DLP agent, including a classification engine, a reputation score calculator, and a detection system to detect violations of a DLP policy based on reputation scores.

FIG. 2 is a block diagram of one embodiment of a DLP agent 120, including a classification engine 202, the reputation score calculator 122, and a detection system 206 to detect violations of a DLP policy based on reputation scores. The DLP agent 120 also includes a violation reporter 208, a policy manager 210, and a policy data store 212. In the depicted embodiment, the classification engine 202 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The classification engine 202 is configured to classify the data of the outbound data transfers 203 as being one of multiple categories, where each category represents a specified data type. In one embodiment, the classification engine 202 is a general field classification engine that classifies the data into one of the general fields, such as, for example, Financial, Corporate, Health, Friends, Music, Videos, Banking, E-Mails, Personal Identifying Information, Confidential, and the like. In another embodiment, the classification engine 202 is an automatic classification engine (ACE), which includes multiple predefined classifications, as well as the ability modify the predefined classifications or add or remove user-defined classifications. The predefined classifications may include the following: 1) Attorney-Client Privilege: Labels; 2) Attorney-Client Privilege: Secondary Privilege; 3) Legal Documents (attachments); 4) Anti-Money Laundering—Financial Transactions and Office of Foreign Assets Control (OFAC) List; 5) Customer Complaints—Legal; 6) Customer Complaints—Service & Support; 7) Customer Complaints Responses; 8) Auto Generated Messages—Read: Not Read: Out of Office Auto Reply, etc; 9) Auto Generated News, Research, and Marketing Feeds—(newsletters, research, shopping marketing); 10) Attachments—Faxes; 11) Attachments—.PSTs, .NSFs; 12) Attachments—PowerPoint; 13) Published Information (e.g. Research, Marketing); 14) Identity Theft; 15) Social Security Numbers; 16) Personally Identifiable Information; 17) Account Numbers; 18) Language—English; 19) Language—Non-English; 20) Language—French; 21) Language—Spanish; 22) Language—German; 23) Language—Chinese (Chinese character set); 24) Language—Japanese (Japanese character set); 25) Language—Korean (Korean character set); 26) Attachments—Video Files; 27) Attachments—Audio Files; 28) Attachments—Audio and Video Files; 29) Attachments—Graphic Files; 30) Internal Use Labeled; 31) Draft Documentation (Attachment); 32) Offensive Language—7 Deadly Words; 33) Offensive Language—Extended Level 1; 34) General Harassment; 35) Sexual Harassment; 36) Discrimination; 37) Religion; 38) Jokes; 39) Chain Mail; 40) Compensation Discussions; 41) Solicitations—Political; 42) Solicitations—Charities; 43) Solicitations—Private Investment; 44) Betting; 45) Gaming; 46) Contact Information Lists; 47) Resumes; 48) Financial Attachments—Firm Balance Sheets and Income Statements; 49) Financial Attachments—Invoices, Bills, Purchase Orders; 50) Financial Communication—Firm Financial Information. Of course, the classification engine 202 may be configured to monitor and classify a subset of the categories listed above for purposes of determining reputations scores and detecting violations of the DLP policy based on the reputations scores. Of course, other categories may be used as would be appreciated by one of ordinary skill in the art having the benefit of this disclosure. The categories (i.e., classifications) may be predefined and may be programmable by the user of the computing system 102 or an administrator of an entity or organization managing the system.

In another embodiment, the classification engine 202 classifies the data of the data transfers using one or more of the file extension type of the data when contained in a file, the content of the data itself, the type of data (e.g., 16-digit numbers for credit cards, 9-digit numbers for social security numbers), the placement of the data in a file, or the like. Alternatively, the classification engine 202 can use other techniques for classifying the data into multiple categories that can be separately ranked by the reputation score calculator 122 for different destination entities.

Once the classification engine 202 has classified the data of the outbound data transfer 203, the classification engine 202 associates the data with one of the categories (e.g., Health, Financial, Corporate, or other data types), and associates the data with the destination entity specified to receive the respective outbound data transfer 203. The classification engine 202 sends this information to the reputation score calculator 122 to compute the reputation score for the data transfer 203. In one embodiment, the reputation score calculator 122 determines a reputation score for the outbound data transfer 203 to a destination entity (e.g., a website) specified to receive the data transfer 203 based on a data type of the data being transferred to the destination entity. The exact computation of the reputation score by the reputation score calculator 122 may differ, but the reputation scores can be used by the detection system 206 to enforce DLP policies. For example, an application server that hosts a web application might obtain a high reputation score for data types that are expected to be useful for the web application's functionality (e.g., music application would be expected to receive data having a data type classified as music or media). The same application server that hosts the web application might obtain a lower reputation score for data types that are not expected to be useful for the web application's functionality (e.g., music application would not be expected to receive social security information). The classification engine 202 and the reputation score calculator 122 permit the data transfers to be scored according to the classification and destination to improve the monitoring and detecting of violations of the policy by the data transfers.

Once the reputation score has been determined, the reputation score is passed to the detection system 206 to determine whether the data transfer violations a DLP policy. The detection system 206 is used to detect the DLP policies and may perform some remedial or notification operation to help enforce the DLP policies. In one embodiment, the detection system 206 is configured to determine the data transfer as risky, or as violating the DLP policy when one of the following occurs: 1) If this is first time that some data is being transmitted to the destination entity by the given transmitting entity (user's computing system); 2) If this is first time that a data of the given category is being transmitted by the given transmitting entity to the destination entity; 3) If the overall reputation score of the destination entity is below a specified reputation threshold; 4) If the reputation score of the destination entity for the given category (referred to herein as an "data-type reputation score") is below a specified reputation threshold. In one embodiment, the reputation score calculator 122 computes the reputation score for the given data transfer 203, but also maintains other reputation score information, such as an overall reputation score for the given entity, a data-type reputation score for each one of the different data types for the given destination entity, and the like.

In some embodiments, when the detection system 206 considers the data transfer as insecure (e.g., detects a violation of the DLP policy), the detection system 206 can pause the data transfer and alert a user or an administrator. For example, the detection system 206 can generate an alert for a user to approve or deny the data transfer. Similarly, the alert can be provided to an administrator to approve or deny the data transfer. The alert may contain information about the overall reputation score of the destination entity, as well as reputation score for a given category of data for that particular destination entity. So, for example, a music application that transmits the user's song preferences or playlist to a reputable radio station server, the reputation score calculator 122 can rank the destination entity as having a good overall reputation score, as well as a good reputation score for the music category, but may rank the destination entity as having a poor reputation score for credit card data or other types of data.

In one embodiment, when the detection system 206 detects the violation, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, a reputation score of the data transfer, an overall reputation score of the destination entity, or other information concerning the violation, an identifier of the user or the client computing system 102 that caused the violation, as well as other information that may be helpful in remedying or recording the incidents.

The policy manager 302 defines DLP policies and stores them in the policy data store 212. The policy may require monitoring for data transfers with reputation scores below one or more specified thresholds. For example, the specified thresholds may be for the overall reputation score of a destination entity, data-type reputation scores for the various categories for the destination entity, etc. The specified thresholds may also be used for different levels of sensitivity. For example, all data transfers of a specific type to a destination entity outside an organization (e.g., a LAN), may receive a specific reputation score that will prevent any data transfers of these data types to destination entities outside of the organization. For another example, the data transfers of questionable data types for the destination entity may invoke the detection system 206 to generate an alarm for a user to allow or deny the data transfer as described herein. The policy may also be used to monitor and detect for other types of DLP violations that do not use the reputation scores. For example, the policy may also specify sensitive data that should trigger a DLP policy if detected in the outbound data transfers 203. The policy manager 302 may create DLP policies based on user input, such as from the user of the client computing system 102 or an administrator of an organization providing the client computing system 102. Alternatively, the policy manager 302 may receive DLP policies from a DLP service provider (e.g., DLP system 108) and store them in the policy data store 212. The policy manager 210 may also be configured to create DLP policies that specify acceptable reputations scores (e.g., define the reputation score thresholds for given categories and/or for given destination entities).

In one embodiment, the detection system 122 compares the reputation score, determined by the reputation score calculator 122, against a reputation threshold, and detects a violation when the reputation score is less than the reputation threshold. In one embodiment, the detection system 122 is configured to prevent the data transfer 203 when the reputation score is less than the reputation threshold. Alternatively, the detection system 122 may be configured to allow the data transfer, but generate an alert to notify the user or an administrator. In another embodiment, the detection system 122 generates an alert when the reputation scores is less than the reputation threshold. The alert may be provided to the user of the client computing system 102 to accept or deny the data transfer. Based on the user's response, the detection system 122 prevents or allows the data transfer.

The DLP system 108 is configured to receive the incident record 227 of the violation from the violation reporter 208, and may be configured to perform some remedial or reporting operation as would be appreciated by one of ordinary skill in the art having the benefit of this disclosure.

It should be noted that the DLP system 120 may include other components for monitoring outbound data transfers 203 and calculating reputation scores for the data transfers to detect violations of the DLP policy, as well as other types of policies. Details regarding these other components have not been included so as to not obscure the description of the present embodiments.

As described above, the exact computation of reputations score may differ, but the following guidelines may be used, for example: 1) To ensure that user does not unfavorably increase a reputation score of an distrusted entity by allowing data transfer to it through multiple other entities, the DLP agent 120 can be configured to include a restriction that the reputation score of an entity cannot rise beyond a function of the value of highest reputation approving data transfer to it. 2) The reputation of transmitting entity also changes when it allows or denies data transfer, but that change is inversely proportional to number of entities that have done the same for the same remote entity. Thus, allowing a popular remote entity may not be so useful to increase the remote entity's reputation score, but denying transmission to a distributed new remote entity may help more. 3) There could be some administrator-controlled reputations—for example, an organization may provide a user with a laptop, and the user may also be using a personal laptop or a USB device in connection with the laptop. The administrator may configure the company laptop with a high reputation initially, thus allowing the user to copy all types of files from my desktop to laptop. The personal device (e.g., laptop or USB device) may have a lower reputation score initially, and the personal device needs to establish a better reputation score over time. In addition, the administrator may cap the earned reputation to a lower value so that it never reaches the reputation score of company controlled devices. For example, the DLP policy may be configured to never allow the user to copy confidential data to the personal device.

In another embodiment, the detection system 122 can use the DLP policies and the reputation score calculator 122 to allow an entity to send specific categories of data to another entity, while preventing another category of data to be sent to the same entity. In some embodiments, an application may send user-specific data back to another machine, such as a server. For example, the application can perform personalized actions based on user preferences, download upgrade patches automatically, and the like, based on those details. The embodiments described herein helps address the problem of data leak by these types of applications. Some other solutions may use reputations scores, but uses the scores to determine whether the entity is malicious or not. As described above, there are applications that may not be considered "malicious" but may still have unwanted access to data via data transfers unbeknownst to the user. These embodiments can be used to help protect against applications that transfer data to remote entities for a genuine purpose. Even when a large number of applications installed on a computing system interacts with applications, websites, or other machines, the computing system can transmit only the right type of data to these destination entities. For example, if a hosted application (e.g., a Facebook application) provides a user with functionality to save my cell phone address book on its server to share with friends, the computing system using these embodiments will not permitted a data transfer to save a credit card number or a user's blood sugar levels to the hosted application. Where previous solutions were concerned with an application being malicious, where the embodiments described herein are directed towards other cases where restriction of data transfers of certain data types for certain destination entities is necessary, for example, where there is insufficient privilege separation, no organization of data, application bugs, etc. Also, as described herein, the embodiments described herein can use social intelligence using the network community service, but may also allow network or system administrators to assign reputation scores to entities.

Figure 3A:
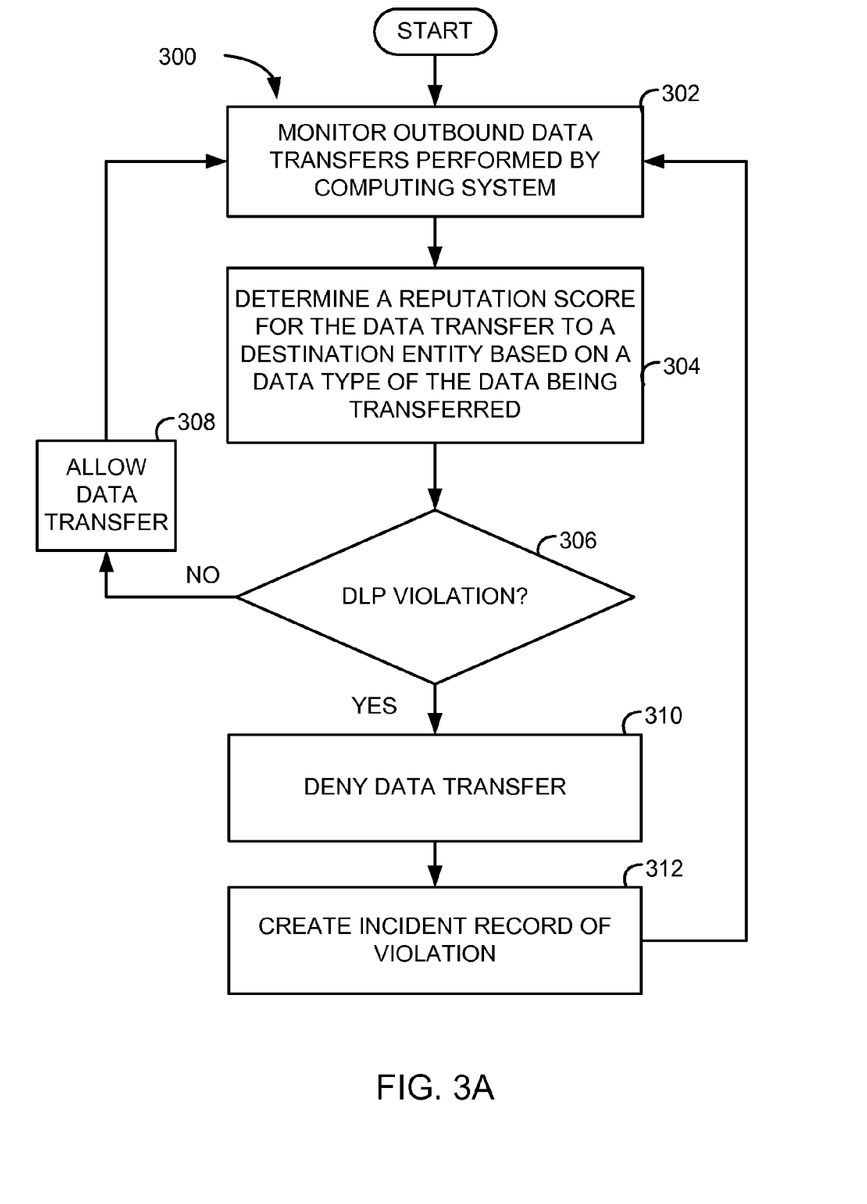
FIG. 3A is a flow diagram of one embodiment of a method of detecting violations of a DLP policy based on reputation scores.

FIG. 3A is a flow diagram of one embodiment of a method 300 of detecting violations of a DLP policy based on reputation scores. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In another embodiment, the DLP agent 120 of FIGS. 1 and 2 performs the method 300. Alternatively, other components of the client computing system 102 can be configured to perform some or all of the method 300.

Referring to FIG. 3A, processing logic begins method 300 by monitoring outbound data transfers performed by the computing system (block 302). In one embodiment, the processing logic monitors outbound network traffic. Alternatively, the processing logic monitors other outbound data transfers, such as data transfers to a USB drive, FTP file transfers, printing activities, or the like. While monitoring in block 302, processing logic determines a reputation score for the data transfers to destination entities based on a data type of the data being transferred (block 304). Next, processing logic detects violations of the DLP policy based on the reputation score (block 306). If the processing logic detects does not detect a policy violation at block 306, the processing logic allows the data transfer (block 308), and returns to monitoring at block 302. If the processing logic detects a DLP violation at block 306, the processing logic may deny the data transfer (block 310), and create an incident record of the violation (block 312). In other embodiments, instead of denying the data transfer, the processing logic may perform other operations as specified by the policy, such as notifying a system administrator, prompting the user to deny or allow the data transfer, and the like.

In one embodiment, the processing logic at block 304 may perform various operations to determine the reputation score. For example, the processing logic can use previously determined reputation scores (tracked by the processing logic), overall reputation scores of the destination entity provided by network community services, data-type reputation scores for the different data types for the destination entity provided by the network community server, or the like. In another embodiment, the processing logic at block 304 performs one or more of the following: 1) determine if the at least one data transfer is a first time that any data is being transmitted to the destination entity by the computing device; 2) determine if the at least one data transfer is a first time that data of the one data type is being transmitted to the destination entity by the computing device; 3) determine if an overall reputation score of the destination entity is below a first reputation threshold; and 4) determine if a data-type reputation score of the destination entity for the one data type is below a second reputation threshold. Alternatively, the processing logic can perform other operations when determining the reputation score at block 304 as would be appreciated by one of ordinary skill in the art having the benefit of this disclosure.

In another embodiment of the method, the processing logic updates an overall reputation score of the destination entity based on the reputation score determined at block 304. The processing logic may also share the overall reputation score, or the reputation score determined at block 304 with a network community service, such as the reputation score community service 110. In another embodiment, the processing logic updates a data-type reputation score of the destination entity for the data type being transferred in the data transfer. The processing logic may also share the data-type reputation score with the network community service.

In another embodiment, the processing logic categorizes the data of the data transfers into one of multiple categories, where each category represents a different data type (e.g., Health, Financial, Music, Video, etc). By categorizing the data into categories, the processing logic can determine separate reputation scores for the destination entity based on the data type. For example, the processing logic may allow a data transfer of music data to a remote radio station server, but prevent a data transfer of financial data to the same remote radio station server. In one embodiment, the processing logic receives input from a user to define the multiple categories. In another embodiment, the processing logic uses predefined categories in a classification engine. In this embodiment, the processing logic may receive user input to define which categories to monitor specifically.

In another embodiment, the processing logic receives from a network community service (e.g., reputation score community service 110) an overall reputation score of a destination entity and/or one or more data-type reputation scores for the given data types for the destination entity. The processing logic can use these reputation scores in determining the current reputation score at block 304 to determine whether to deny or allow the data transfer. In another embodiment, the processing logic tracks the decisions to deny or allow, and use the results as a parameter to be fed back into the determination made at block 304. For example, in one embodiment, the processing logic tracks a number of previously-detected violations of the DLP policy by previous data transfers to the destination entity and calculates the reputation score for the data transfer based on the data type being transferred to the destination entity and the tracked number of previously-detected violations.

In one embodiment, the processing logic at block 306 detects a DLP violation by comparing the reputation score, determined at block 304) against a specified reputation threshold for a given data type of the data being transferred. The processing logic detects the DLP violation, for example, when the reputation score is less than the specified reputation threshold. In response, the processing logic prevents the data transfer to the destination entity when the reputation score is less than the specified reputation threshold for the given data type of the data being transferred. Of course, the convention of the reputation scores and the reputation thresholds may be reversed as would be appreciated by one of ordinary skill in the art having the benefit of this disclosure.

Figure 3B:
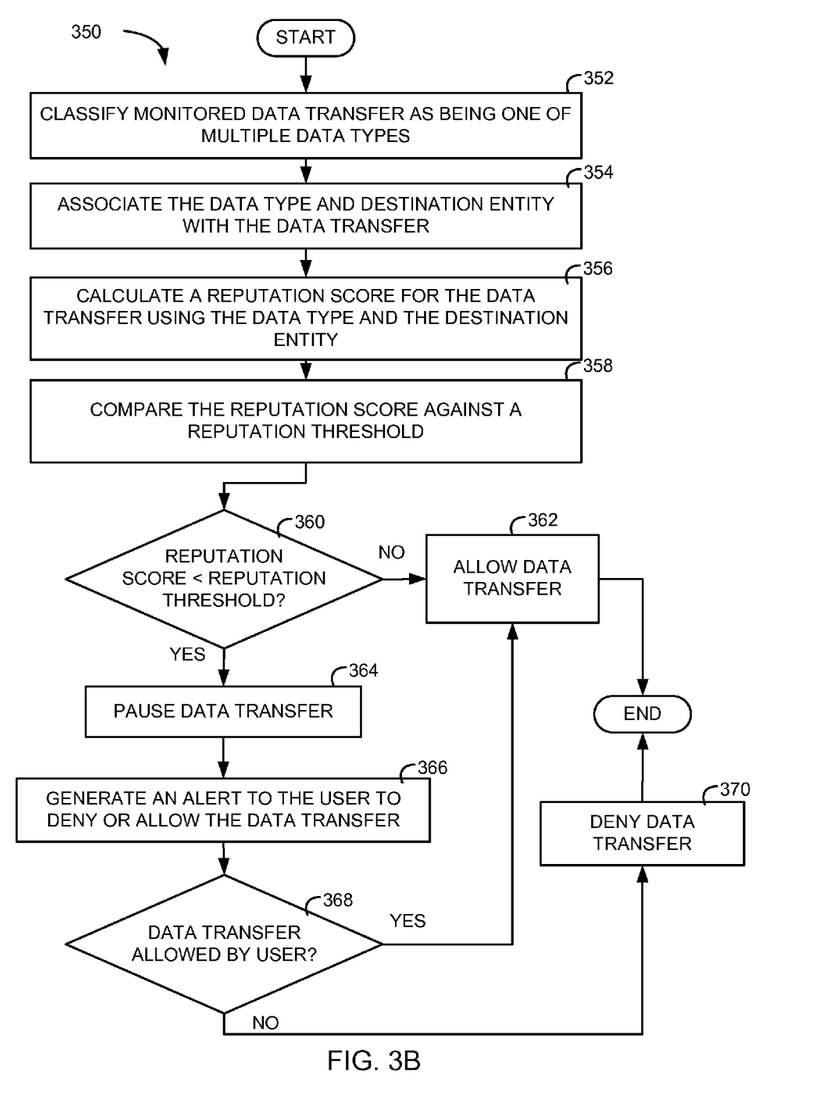
FIG. 3B is a flow diagram of another embodiment of a method of detecting violations of a DLP policy based on reputation scores.

FIG. 3B is a flow diagram of another embodiment of a method 350 of detecting violations of a DLP policy based on reputation scores. The method 350 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 350. In another embodiment, the DLP agent 120 of FIGS. 1 and 2 performs the method 350. Alternatively, other components of the client computing system 102 can be configured to perform some or all of the method 350.

Referring to FIG. 3B, processing logic of method 350 begins by classifying monitored data transfers to destination entities as being one of multiple data types (categories) (block 352). Processing logic associates the data type and the destination entity with the data transfer (block 354), and calculates a reputation score for the data transfer using the data type and the destination entity (block 356). The processing logic may calculate higher reputation scores for the destination entity for the data types that the user expects to send to the destination entity, and lower reputation scores for the data types that the user does not expect to send to the destination entity. Next, the processing logic compares the reputation score against a reputation threshold (block 358). The processing logic determines if the reputation score is less than the reputation threshold (block 360). If at block 360 the reputation score is not less than the reputation threshold, the processing logic allows the data transfer (block 362), and the method ends. However, if at block 360 the reputation score is less than the reputation score, the processing logic pauses the data transfer (block 364), and generates an alert to the user to deny or allow the data transfer (block 366). At block 368, the processing logic determines if the user allows or denies the data transfer. If the user allows the data transfer at block 368, the processing logic allows the data transfer at block 362. Otherwise, the processing logic denies the data transfer (block 370), and the method ends.

In one embodiment, the processing logic at block 356 performs one or more of the following: 1) determine if the at least one data transfer is a first time that any data is being transmitted to the destination entity by the computing device; 2) determine if the at least one data transfer is a first time that data of the one data type is being transmitted to the destination entity by the computing device; 3) determine if an overall reputation score of the destination entity is below a first reputation threshold; and 4) determine if a data-type reputation score of the destination entity for the one data type is below a second reputation threshold. Alternatively, the processing logic can perform other operations when calculating the reputation score at block 356 as would be appreciated by one of ordinary skill in the art having the benefit of this disclosure.

Figure 4:
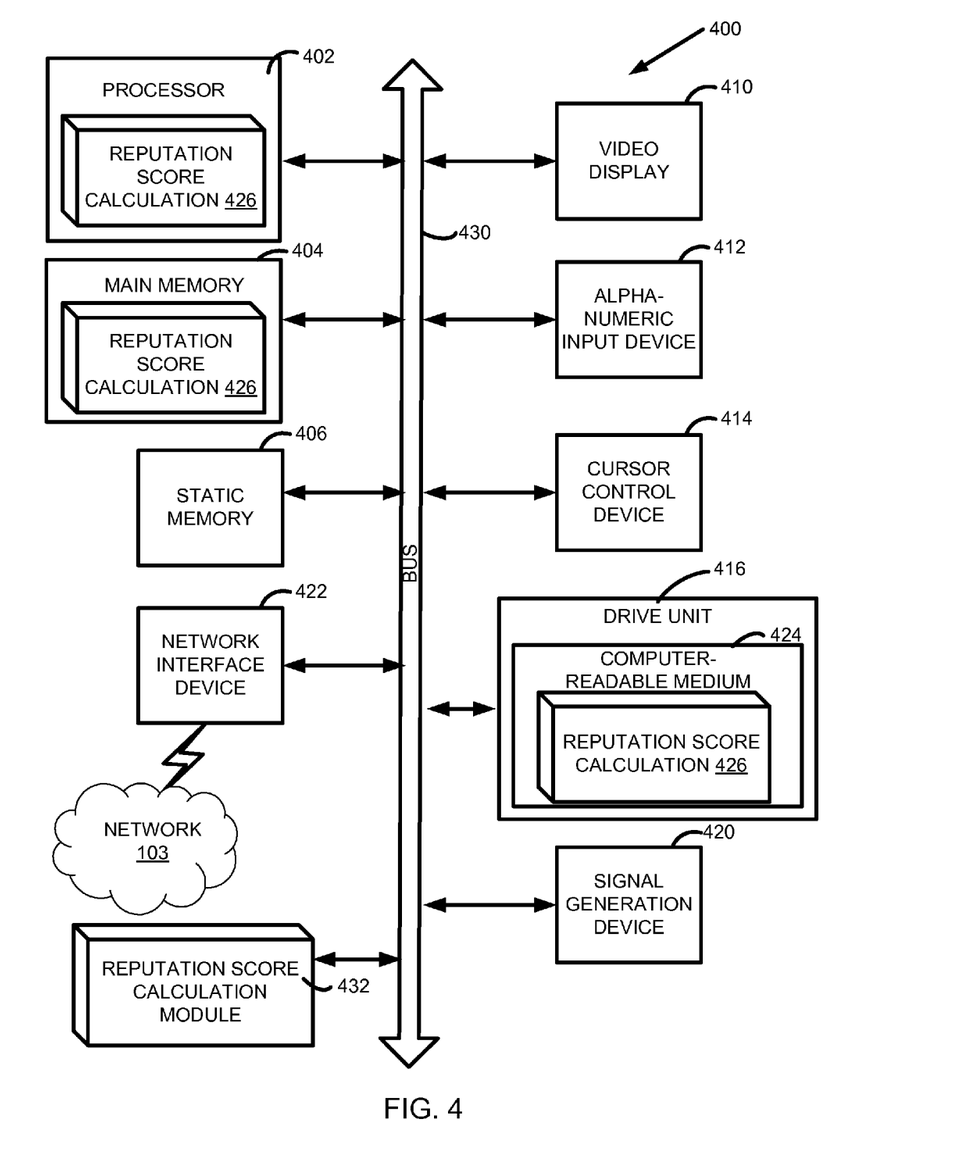
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 300 and 350 of FIGS. 3A and 3B.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for reputation score calculation 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., reputation score calculation 426) embodying any one or more of the methodologies or functions described herein. The reputation score calculation 426 may also reside, completely or at least partially, within the main memory 404 and/or within the processor 402 during execution thereof by the computing system 400, the main memory 404, and the processor 402 also constituting computer-readable media. The reputation score calculation 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The reputation score calculation module 432, components, and other features described herein (for example in relation to FIGS. 1, 2, 3A, and 3B) can be implemented as discrete hardware components or integrated in the functionality of hardware components such as ASICS, FPGAs, DSPs, or similar devices. The reputation score calculation module 432 may implement operations of reputation score calculation as described herein with respect to FIGS. 3A and 3B. In addition, the reputation score calculation module 432 can be implemented as firmware or functional circuitry within hardware devices. Further, the reputation score calculation module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
monitoring, by a data loss prevention (DLP) agent executing on a computing system, outbound data transfers performed by the computing system;
classifying the outbound data transfers as being one of a plurality of data types;
determining a first reputation score for a first outbound data transfer to a destination entity specified to receive the first outbound data transfer based on the classifying and the destination entity, wherein the first outbound data transfer is a first data type of the plurality of data types;
determining a second reputation score for a second outbound data transfer to the destination entity specified to receive the second outbound data transfer based on the classifying and the destination entity, wherein the second outbound data transfer is a second data type of the plurality of data types;
comparing the first reputation score against a reputation threshold to detect a first violation of a DLP policy, wherein the first violation is detected when the first reputation score is less than the reputation threshold;
comparing the second reputation score against the reputation threshold to detect a second violation of the DLP policy, wherein the second violation is detected when the second reputation score is less than reputation threshold; and
performing at least one of remedial operations or reporting operations in response to the first violation, second violation or both being detected.

2. The method of claim 1, wherein the performing comprises:
generating an alert to a user of the computing system to approve or deny a respective one of the first outbound data transfer or second outbound data transfer;
receiving user input from the user to approve or deny the respective outbound data transfer;
allowing the respective outbound data transfer when the user approves the respective outbound data transfer; and
preventing the respective outbound data transfer when the user denies the respective outbound data transfer.

3. The method of claim 1, further comprising updating an overall reputation score of the destination entity based on the first reputation score and the second reputation score.

4. The method of claim 3, further comprising sharing the overall reputation score with a network community service.

5. The method of claim 1, further comprising:
updating a first data-type reputation score of the destination entity for the first data type based on the first reputation score; and
updating a second data-type reputation score of the destination entity for the second data type based on the second reputation score.

6. The method of claim 5, further comprising sharing the first data-type reputation score and the second data-type reputation score with a network community service.

7. The method of claim 1, wherein the determining the first reputation score or the second reputation score comprises:
associating the data of a respective one of the first outbound data transfer or second outbound data transfer with a respective one of the first data type or second data type;
associating the data with the destination entity; and
calculating the respective one of the first reputation score or second reputation score using the respective data type and the destination entity.

8. The method of claim 7, wherein the calculating the respective one of the first reputation score or second reputation score comprises at least one of the following:
determining if the respective outbound data transfer is a first time that any data is being transmitted to the destination entity by the computing system;
determining if the respective outbound data transfer is a first time that data of the respective data type is being transmitted to the destination entity by the computing system;
determining if an overall reputation score for the destination entity is below an overall reputation threshold; or
determining if a data-type reputation score of the destination entity for the respective data type is below a data-type reputation threshold.

9. The method of claim 1, further comprising categorizing the data of each of the outbound data transfers into one of a plurality of categories, wherein each of the plurality of categories represents a different one of the plurality of data types.

10. The method of claim 9, further comprising receiving input from a user of the computing system to define the plurality of categories.

11. The method of claim 1, further comprising receiving at least one of an overall reputation score of the destination entity from a network community service or one or more data-type reputation scores for the destination entity for the plurality of data types.

12. The method of claim 1, wherein the determining the respective one of the first reputation score or second reputation score comprises:
tracking a number of previously-detected violations of the DLP policy by previous data transfers to the destination entity; and
calculating the respective one of the first reputation score or second reputation score based on the respective data type being transferred to the destination entity and the tracked number of previously-detected violations.

13. The method of claim 1, further comprising:
comparing the first reputation score against a first data-type reputation threshold for the first data type, wherein the first violation is detected when the first reputation score is less than the first data-type reputation threshold;
comparing the second reputation score against a second data-type reputation threshold for the second data type, wherein the second violation is detected when the second reputation score is less than the second data-type reputation threshold; and
performing the at least one of the remedial operations or reporting operations in response to the first violation, second violation or both being detected based on the comparing against the first data-type reputation threshold and second data-type reputation threshold.

14. A computing system, comprising:
a memory; and
a processor coupled with the memory to
monitor outbound data transfers performed by the computing system;
classify the outbound data transfers as being one of a plurality of data types;
determine a first reputation score for a first outbound data transfer to a destination entity specified to receive the first outbound data transfer based on the classified data type and the destination entity, wherein the first outbound data transfer is a first data type of the plurality of data types;

determine a second reputation score for a second outbound data transfer to the destination entity specified to receive the second outbound data transfer based on the classified data type and the destination entity, wherein the second outbound data transfer is a second data type of the plurality of data types;

compare the first reputation score against a reputation threshold to detect a first violation of a DLP policy, wherein the first violation is detected when the first reputation score is less than the reputation threshold;

compare the second reputation score against the reputation threshold to detect a second violation of the DLP policy, wherein the second violation is detected when the second reputation score is less than reputation threshold; and perform at least one of remedial operations or reporting operations in response to the first violation, second violation or both being detected.

15. The computing system of claim 14, wherein the processor is further to:

generate an alert to a user of the computing system to approve or deny a respective one of the first outbound data transfer or second outbound data transfer;

receive user input from the user to approve or deny the respective outbound data transfer;

allow the respective outbound data transfer when the user approves the respective outbound data transfer; and prevent the respective outbound data transfer when the user denies the respective outbound data transfer.

16. The computing system of claim 14, wherein the processor is further to update an overall reputation score of the destination entity based on the first reputation score and the second reputation score.

17. A non-transitory computer readable storage medium including instructions that, when executed by a processor, cause the processor to perform operations comprising:

monitoring, by a data loss prevention (DLP) agent executing on the processor, outbound data transfers performed by the processor;

classifying the outbound data transfers as being one of a plurality of data types;

determining a first reputation score for a first outbound data transfer to a destination entity specified to receive the first outbound data transfer based on the classifying and the destination entity, wherein the first outbound data transfer is a first data type of the plurality of data types;

determining a second reputation score for a second outbound data transfer to the destination entity specified to receive the second outbound data transfer based on the classifying and the destination entity, wherein the second outbound data transfer is a second data type of the plurality of data types;

comparing the first reputation score against a reputation threshold to detect a first violation of a DLP policy, wherein the first violation is detected when the first reputation score is less than the reputation threshold;

comparing the second reputation score against the reputation threshold to detect a second violation of the DLP policy, wherein the second violation is detected when the second reputation score is less than reputation threshold; and performing at least one of remedial operations or reporting operations in response to the first violation, second violation or both being detected.

18. The non-transitory computer readable storage medium of claim 17, wherein the performing comprises:

generating an alert to a user to approve or deny a respective one of the first outbound data transfer or second outbound data transfer;

receiving user input from the user to approve or deny the respective outbound data transfer;

allowing the respective outbound data transfer when the user approves the respective outbound data transfer; and preventing the respective outbound data transfer when the user denies the respective outbound data transfer.

19. The non-transitory computer readable storage medium of claim 17, wherein the operations further comprise:

updating an overall reputation score of the destination entity based on the first reputation score and the second reputation score; and sharing the overall reputation score with a network community service.

20. The non-transitory computer readable storage medium of claim 17, wherein the operations further comprise:

updating a first data-type reputation score of the destination entity for the first data type based on the first reputation score;

updating a second data-type reputation score of the destination entity for the second data type based on the second reputation score; and sharing the first data-type reputation score and the second data-type reputation score with a network community service.

\* \* \* \* \*